United States Patent Office 2,827,877
Patented Mar. 25, 1958

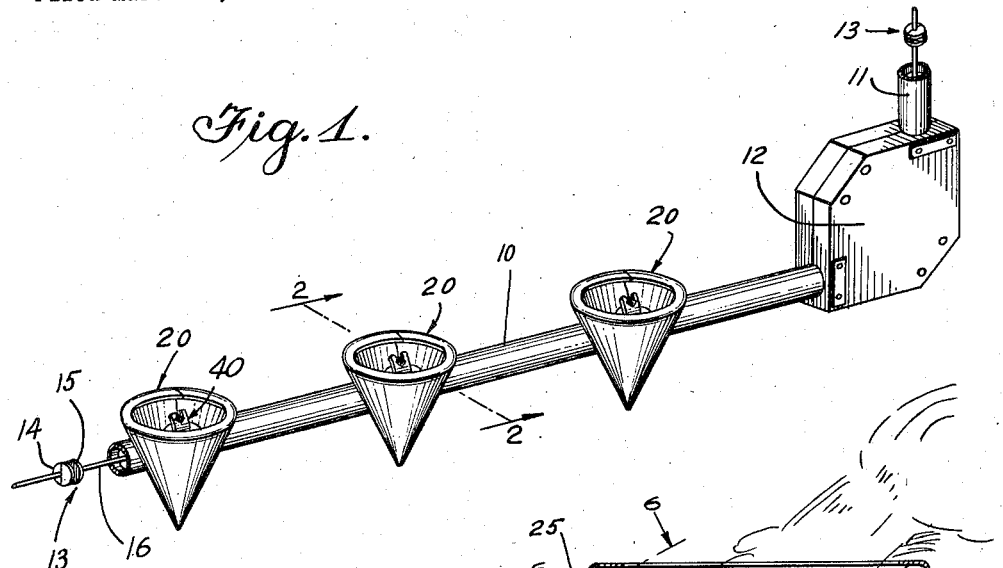
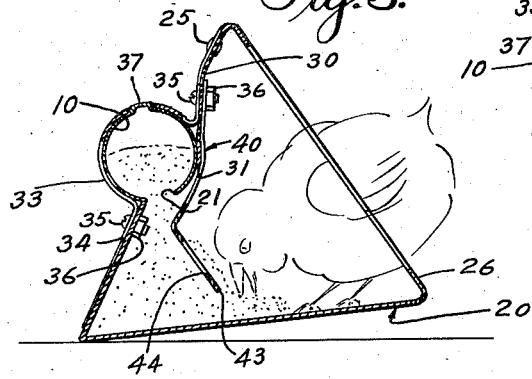
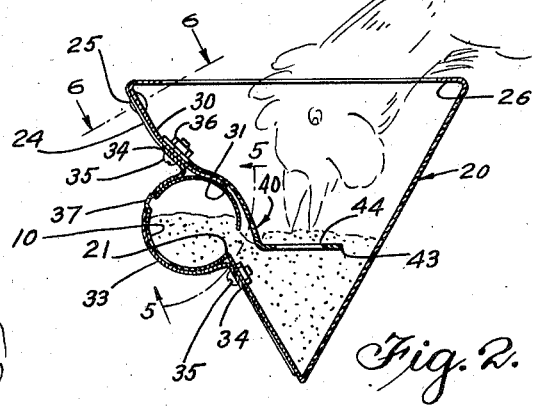
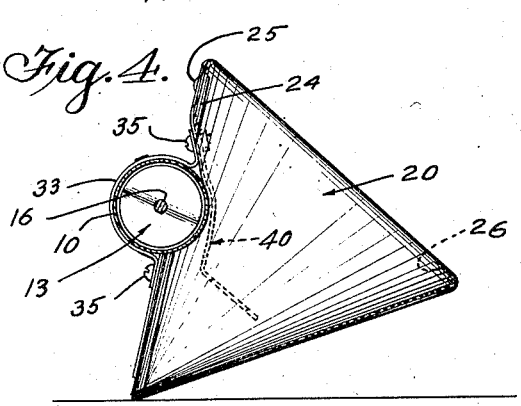
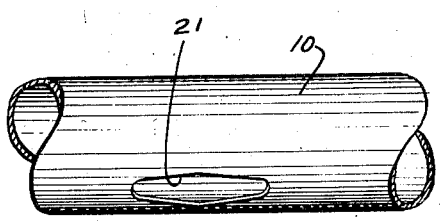

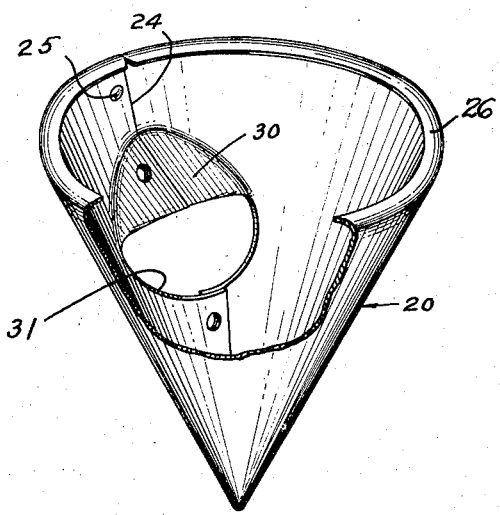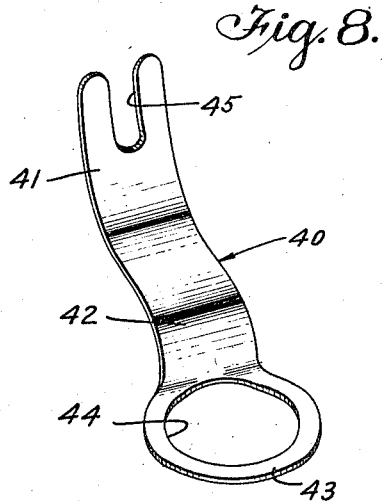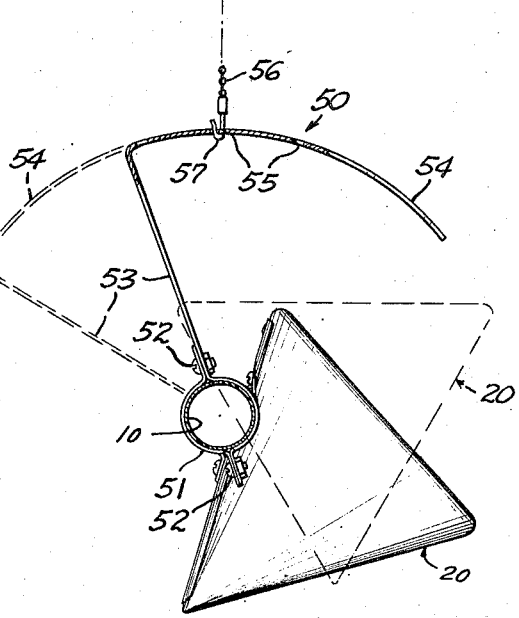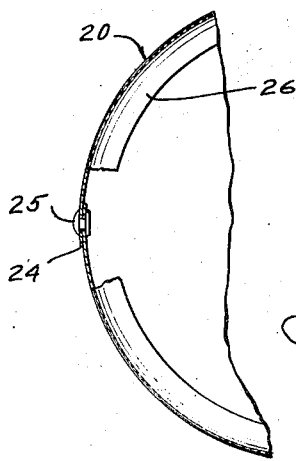

2,827,877

ADJUSTABLE FEED RECEPTACLE FOR MECHANICAL FEEDING APPARATUS

Harold W. Hart, Glendale, Calif., assignor to Food Machinery and Chemical Corporation, San Jose, Calif., a corporation of Delaware Application March 14, 1955, Serial No. 493,846

12 Claims. (Cl. 119—61)

This invention relates generally to poultry feeding equipment and particularly to an automatically operated system for supplying loose feed to the poultry. Specifically, the invention is concerned with an improved receptacle or container into which the loose, dry feed is delivered by an endless conveyor system and from the feed is removed by the poultry.

Practical, scientific, poultry-raising practices require that the poultry be fed the proper foods in the necessary amounts at predetermined intervals and that the food be maintained clean and wholesome to prevent contamination which, if allowed to occur might result in disease and loss of the flock of chickens. In an effort to attain the desirable conditions mentioned above, automatic feeding apparatus of various types have been proposed. In such systems currently in use, the loose feed is delivered from a hopper into a conveyor tube extending alongside the cages or to areas within an extended chicken pen or field to convey the loose feed to the poultry. An endless, flexible conveyor is caused to travel through the conveyor tube and serves to feed the material therethrough. In accordance with the usual practice, the conveyor tube is provided with openings through which the loose material feeding through the tube is discharged into troughs arranged below the openings and from which the feed is taken by the poultry.

Such feeding troughs have several disadvantages, one of which is that the loose feed is deposited over a relatively large area lengthwise of the trough in a long pile and this may result in an over-supply of food. In addition, since the trough has a long, although narrow, opening through which the chickens insert their heads to reach the food, it has been found that a considerable amount of the food is scattered by the bills of the chickens and displaced from the trough onto the ground or floors of the cages. Such feed dispersed from the trough may become contaminated and, if later eaten by the poultry, may result in disease. Moreover, when the trough is employed for feeding small chicks who have a natural tendency to scratch, the particles of feed are frequently thrown from the trough to result in wasting of the feed. Furthermore, in some feeding troughs it is possible for the poultry to insert their bills into the openings in the conveyor tubes to be engaged by the moving conveyor and this may result in serious injury to the poultry.

It is therefore an object of this invention to obviate the faults and deficiencies referred to above by providing a feed receptacle or container which is so shaped and positioned relative to a discharge opening of the conveyor tube that the feed is confined to a small area at the bottom of the receptacle so that the chicken is compelled to reach downwardly to a considerable depth to reach the feed, the walls of the receptacle thus serving as guards to preclude strewing of the feed from the receptacle onto the ground.

Another object of the invention is to provide a feeding receptacle which is of funnel shape and attachable against a side of the conveyor tube, said funnel having an opening disposed in its side and adjacent its lower end, said opening registering with the discharge opening in the tube so that the loose, powdered grain is deposited within the lower conical end of the funnel, from which point it is consumed by the poultry.

Another object of the invention is to provide a poultry feeding device in which the funnel-shaped feed receptacle is clamped against the side of the conveyor tube which is mounted for rotative adjustment. By this provision, it is possible to adjust the axis of the funnel angularly to adapt it for use in feeding small chicks, pullets and full grown hens. In accordance with another important object and feature of the invention, the rim of the funnel-shaped receptacle is provided with an inturned flange which provides an annular baffle against which particles of the feed, thrown from the inner end of the receptacle by the bills of the poultry or by the scratching action of the chicks, will impinge to prevent their displacement from the receptacle, the baffle having particular utility when the funnel is adjusted to a position where its axis is only slightly inclined.

Another object of the invention is to provide a feed receptacle, of the character referred to, in which is embodied a guard ring located within the inner end portion of the receptacle and axially thereof, said ring being disposed above the feed inlet opening and of a size such that it prevents insertion of the chicken's bill into the conveyor tube through the inlet opening. The guard ring further prevents lowering of the bill to the full depth of the feed present in the bottom of the funnel and thus avoids scattering of the feed particles upwardly in the receptacle. According to the invention, the guard ring is preferably formed at the lower end of a metal strip adjustably secured within the funnel against a side of the same, adjustment of the strip serving to locate the guard ring relative to the feed inlet opening.

Further objects of the invention will appear from the following description and from the drawings which are intended for the purpose of illustration only, and in which:

Fig. 1 is a perspective view of a section of the conveyor tube of an automatic poultry feed supplying apparatus, showing the present feed receptacles applied to use therewith;

Fig. 2 is an enlarged, cross-sectional view through one of the feed receptacles, taken on line 2—2 of Fig. 1, the receptacle being in a substantially vertical position to adapt it for feeding hens;

Figs. 3 is a view similar to Fig. 2, with the funnel-shaped receptacle adjusted to a slightly inclined position as is the case when small chicks are to be fed;

Fig. 4 is a similar view, illustrating the recepetacle tilted to an intermediate position for feeding pullets;

Fig. 5 is an enlarged sectional view taken on line 5—5 of Fig. 2 and showing the discharge opening in the conveyor tube;

Fig. 6 is an enlarged sectional view, taken on line 6—6 of Fig. 2;

Fig. 7 is an enlarged perspective view of the funnel-shaped feed receptacle;

Fig. 8 is an enlarged perspective view of the guard element; and

Fig. 9 is a section taken transversely through the conveyor feed tube of Fig. 1 and showing a mounting arrangement for the tube.

Referring to the drawings in detail, the present improvements are illustrated as embodied in an automatic poultry feeding system of the general character as that disclosed in my Patent No. 2,738,765 entitled Automatic Poultry Feeding Systems. In such an apparatus, loose feed is fed from a hopper into a conveyor tube wherein travels a flexible, endless conveyor operative to feed the material through the tube to feeding troughs located in the conveyor circuit, the tube having openings through which the conveyed material is discharged into the troughs. In the present drawings, sections of the conveyor tube are shown at 10 and 11, these right-angularly related sections being joined by a corner box or housing 12 in which a grooved wheel (not shown) is rotatable. One of the conveyor tube sections is adapted to receive loose poultry feed from a hopper and an endless, flexible conveyor element 13 extends throughout the entire closed conveyor tube circuit to convey the loose material. The conveyor element 13 is fully disclosed in my pending patent application, Serial No. 283,573, filed April 22, 1952, now matured into Patent No. 2,762,495 and titled Flexible Conveyors in Troughs and Tubes, and for this reason it is not shown or described in detail in the present application. Suffice it to state that the conveyor element 13 consists of spaced pairs of rings 14, 15 universally connected by rod-type links 16. The conveyor 13 extends around the grooved wheels within the corner housings 12 to be guided thereby.

The present invention is concerned primarily with feeding receptacles 20 into which the conveyed loose feed is deposited from the conveyor tube 10 and from which it is consumed by the poultry. As will be described in detail, each receptacle 20 is attached to the tube 10 and is adapted to receive the loose material discharged from the tube through openings 21 in a side thereof. As shown in Fig. 5, each opening 21 is of substantially diamond shape, this contour having been found to provide a scoop edge of minimum practical width.

Each receptacle 20 consists of a cone constructed from sheet metal rolled into conical form, the longitudinal edges of the metal overlapping, as indicated at 24 in Fig. 6, and being secured together by rivets 25. At the open mouth end of the cone, the metal is folded inwardly to provide an inturned, annular flange 26.

The cone 20 is indented at its seamed side 24 to provide an inwardly and downwardly sloping pad 30, the lower portion of which may be curved to follow the contour of the conveyor tube 10. Below the pad 30, the metal is cut away to provide a substantially semi-circular inlet opening 31.

Each conical receptacle is detachably connected to the conveyor tube 10 by means of a U-shaped clamp 33 which partly encircles the tube, the clamp 33 having outwardly bent portions 34 at its ends. Extending through holes in these portions and holes in the side of the cone 20 are screws 35 which project into the cone. Nuts 36 are screwed onto the inner ends of the screws to secure the clamp to the cone and to draw the clamp into frictional engagement with the tube 10. A small lug or protuberance 37 projecting from the tube 10 is received in a hole in the clamp to key the latter against rotation on the tube.

As will be noted by reference to Fig. 2, the inlet opening 31 in the side of the cone 20 registers with the discharge opening 21 so that loose, powdered grain conveyed in the tube 10 may drop through the aligned openings to be deposited in the lower apex end of the cone-shaped receptacle 20, as indicated in Fig. 2. The feed material thus dispensed from the tube 10 into the receptacle may be taken up by the poultry who insert their heads into the receptacle. It is well known that when poultry are feeding upon finely divided or powdered grains, such as dry mash, they dig into the material with their bills in quick succession and as a result of this procedure particles of the dry, powdered grain are scattered. By the use of the present cone-shaped receptacle or container, the ejection of such scattered particles from the receptacle is effectively prevented by the circular wall thereof which extends to a considerable height above the material. In addition, the annular flange 26 serves as a trap in further guarding against displacement of the feed from the receptacle.

To further guard against throwing of the feed from the receptacle 20, the present invention contemplates the provision of an inner guard element which is located within the lower portion of the cone. The guard element 40 consists of a strip of metal having an upper, relatively straight portion 41, an intermediate curved portion 42 and a lower, right-angularly projecting guard ring portion 43 (Fig. 8). The upper portion 41 is provided with a slot 45 through which the upper mounting screw 35 extends, the nut 36 being set up against this portion 41 to fasten the guard element in place within the cone. By loosening the nut 36, the guard element may be adjusted to locate its guard ring 43 at desired locations relative to the aligned openings 21, 31. Ordinarily, the guard ring is disposed at a height slightly above the opening 21 so that the powdered grain fed into the receptacle rises to a level slightly above the ring, as shown in Fig. 2.

It will be observed that the opening 44 in the ring 43 is of a size to allow the bill of a chicken to pass downwardly into the supply of feed in the lower end of the cone. Also, the outside diameter of the ring is considerably less than the diameter of the cone 20 at the level of the ring so that there exists an annular space for accommodating the bill of the chicken. It is thus seen that while the poultry may pick up the feed in the usual manner, penetration of their bills into the feed is controlled or restricted by the guard ring in such a manner that they are unable to shake their bills sidewise. Consequently, dispersing or scattering of the feed due to shaking of their heads is virtually impossible so that displacement of the feed from the feeding receptacle is effectively avoided. In addition, the guard ring 43 safeguards against insertion of the chicken's bill through the openings 21, 31 into the conveyor tube 10 which, if allowed to occur, might result in injury to the bill by the moving conveyor element 13.

The cone-shaped receptacle 20 is suitable for supplying loose feed to poultry of all ages and sizes. When the receptacle is used for feeding hens, it is employed in the upright position shown in Figs. 1 and 2. When supplying feed to chicks, the receptacle is adjusted to the slightly inclined position illustrated in Fig. 3 to allow the chicks to enter the receptacle. Small chickens invariably scratch the feed during eating and when this occurs, ejections of the scratched grain from the receptacle is minimized by the flanged rim or baffle 26. Chickens of intermediate growth are also fed from the receptacle 20 and in this case the cone is tilted to the intermediate position shown in Fig. 4. Thus, by the present invention the receptacle may be adjusted to adapt it for feeding poultry of all ages.

In order to adjust the angularity of the cone-shaped feeding receptacle, the invention contemplates the provision of a hanger means which may take the form illustrated in Fig. 9. The hanger means 50, herein shown by way of example, includes a two-part strap-type clamp 51 which is secured fast around the conveyor tube 10 by means of bolts 52. Carried by the clamp 51 is the lower end of a leg 53 of the hanger 50. The hanger also has an arcuate segment 54 arranged concentric with the axis of the tube 10 and provided with a plurality of spaced holes 55. A chain 56 may be suspended from the roof structure of a poultry coop or enclosure and provided with a hook 57 which is engageable selectively in any of the holes 55. By this hanger means, the conveyor tube section 10, and the conical feed receptacles 20 carried thereby, is adequately supported from above, it being understood that a plurality of the hangers are employed and spaced axially of the tube, which may be several hundred feet in length. It will be apparent that by engaging the hooks 57 of the suspension chains 56 in the appropriate holes 55 of the segment 54, the tube 10 is conveniently adjusted rotatively to locate the feed receptacles 20 at selected angles.

It will be observed from the foregoing that the present invention provides a highly practical and efficient apparatus for feeding poultry. As a particular feature of the invention, the feed receptacles are of conical form and adapted to contain a predetermined amount of the dry, powdered grain and other ingredients within their lower apex ends, the relatively high sides of the cones serving to guard against undesirable dispersement of the grain from the receptacles onto the ground or floor. According to the present concept, the conical feed receptacle is provided with an inturned flange at its upper open end, said flange providing an annular baffle for further guarding against displacement of feed from the receptacle. Another important feature of the invention resides in the guard ring which is located within the conical receptacle adjacent the inlet opening, said ring limiting entrance of the bills of the poultry into the supply of feed and guarding against scattering of the feed by restricting movement of the poultry bills within the grain containing end of the receptacle. In addition, said guard ring serves as a bar against insertion of the bills of the poultry into the conveyor tube. As a further feature of the invention, means are provided by which the conical feed receptacles may be adjusted angularly to adapt them for feeding poultry of all sizes.

In accordance with the provisions of the patent statutes, I have herein described the principle of the invention, together with the structure which I now consider to represent the best embodiment of the invention. I wish to have it understood, however, that various modifications might be made in the structure without departing from the spirit or scope of the invention as defined in the appended claims.

I claim as my invention:

1. A poultry feeder, comprising a conical receptacle having a lower, closed apex end and an upper open end, said upper end having an inturned annular flange, and a guard element mounted in stationary position in said receptacle in spaced relation above the bottom of the receptacle, said guard element having an opening therein proportioned to permit the beak of a fowl to be projected therethrough but to prevent the entry of the fowl's head.

2. A poultry feeder, comprising: a conical receptacle having a lower, closed apex end and an upper open end, said receptacle having an inlet opening in its side through which loose feed may be introduced into the lower end of the receptacle, said opening being located intermediate said upper and lower ends; and stationary guard means located within said receptacle adjacent said opening and extending transversely of the receptacle, and means defining an opening in said guard means proportioned to permit the beak of a fowl to be projected therethrough but to prevent the entry of the fowl's head.

3. A poultry feeder, comprising: a conical receptacle having a lower, closed apex end and an upper open end, said receptacle having an inlet opening in its side through which loose feed may be introduced into the lower end of the receptacle, said opening being located intermediate said upper and lower ends; and a guard ring disposed in stationary position a predetermined distance above said lower end and extending transversely of the receptacle adjacent said opening.

4. A poultry feeder, comprising: a conical receptacle having a lower, closed apex end and an upper open end, said recepticle having an inlet opening in its side through which loose feed may be introduced into the lower end of the receptacle, said opening being located intermediate said upper and lower ends; and a guard element adjustably mounted in stationary position within the receptacle, said element having a guard ring disposed concentrically about the axis of symmetry of the receptacle and adjacent said opening.

5. An automatic poultry feeding apparatus, including: a conveyor tube having longitudinally-spaced discharge openings, said tube being adapted to contain loose feed; a flexible conveyor movable in said tube for conveying the feed through said tube to be discharged through said discharge openings; conical feed receptacles having apertured wall portions curved to conform to the curvature of said tube, and means for securing said conical receptacles in abutting relation with said tube with the aperture in each curved wall portion located adjacent a discharge opening in said tube for receiving the feed discharged from said tube.

6. An automatic poultry feeding apparatus, including: a conveyor tube having longitudinally-spaced discharge openings, said tube being adapted to contain loose feed; a flexible conveyor movable in said tube for conveying the feed through said tube to be discharged through said discharge openings; and conical feed receptacles carried by said tube adjacent said discharge openings, said receptacles having lower, closed apex ends and upper open ends, said receptacles also having feed inlet openings in their side walls registering with said discharge openings through which the feed can be transferred laterally from said tube into said receptacles.

7. An automatic poultry feeding apparatus, including: a conveyor tube having longitudinally-spaced discharge openings, said tube being adapted to contain loose feed; a flexible conveyor movable in said tube for conveying the feed through said tube to be discharged through said discharge openings; conical feed receptacles carried by said tube adjacent said discharge openings, said receptacles having lower, closed apex ends and upper open ends, said receptacles also having feed inlet openings in their side walls registering with said discharge openings through which the feed can be transferred laterally from said tube into said receptacles; and clamping means for connecting said receptacles to said tube.

8. An automatic poultry feeding apparatus, including: a conveyor tube having longitudinally-spaced discharge openings, said tube being adapted to contain loose feed; a flexible conveyor movable in said tube for conveying the feed through said tube to be discharged through said discharge openings; conical feed receptacles carried by tube adjacent said discharge openings and having an open end providing an access opening, said receptacles also having feed inlet openings in their sides registering with said discharge openings through which the feed can be transferred from said tube into said receptacles; clamping means for connecting said receptacles to said tube; and means for supporting said tube and said receptacles and including an adjustable member adapted to position said conical receptacles in a plurality of positions in each of which the axis of symmetry of each conical receptacle is inclined at a different angle relative to the vertical.

9. An automatic poultry feeding apparatus, including: a conveyor tube having longitudinally-spaced discharge openings, said tube being adapted to contain loose feed; a flexible conveyor movable in said tube for conveying the feed through said tube to be discharged through said discharge openings: conical feed receptacles carried by said tube adjacent said discharge openings, said receptacles having lower, closed apex ends and upper open ends, said receptacles also having feed inlet openings in their sides registering with said discharge openings through which the feed can be transferred from said tube into said receptacles; clamping means for connecting said receptacles to said tube; and supporting means for supporting said tube and said receptacles for rotative adjustment to vary the angle of inclination of the axes of symmetry of said receptacles relative to the vertical whereby said receptacles may be selectively positioned and retained in any one of a plurality of different positions.

10. A poultry feeding apparatus as defined in claim 6, having adjustable means mounting said feed receptacles for selective disposition in a plurality of different angular positions to vary the disposition of said feed inlet openings relative to the horizontal.

11. A poultry feeding apparatus as defined in claim 9, having adjustable means cooperating with said supporting means for securing said tube thereto for rotative adjustment of said feed receptacles about a horizontal axis.

12. A poultry feeding apparatus as defined in claim 9, wherein said tube supporting means includes an angle hanger having one leg secured to said tube and the other leg adjustable secured to said supporting means.

References Cited in the file of this patent

UNITED STATES PATENTS

| | | |
|---|---|---|
| 1,259,253 | McCullough | Mar. 12, 1918 |
| 1,895,066 | Bergstrom | Jan. 24, 1933 |
| 2,563,321 | Dugan | Aug. 7, 1951 |
| 2,639,690 | Klinzing | May 26, 1953 |
| 2,646,023 | Virgil | July 21, 1953 |
| 2,664,069 | Anderson | Dec. 29, 1953 |
| 2,681,639 | Littlefield | June 22, 1954 |